(12) United States Patent
Wels et al.

(10) Patent No.: US 8,548,213 B2
(45) Date of Patent: Oct. 1, 2013

(54) METHOD AND SYSTEM FOR GUIDING CATHETER DETECTION IN FLUOROSCOPIC IMAGES

(75) Inventors: Michael Wels, Bamberg (DE); Peng Wang, Princeton, NJ (US); Terrence Chen, Princeton, NJ (US); Simone Prummer, Neunkirchen am Brand (DE); Dorin Comaniciu, Princeton Junction, NJ (US)

(73) Assignees: Siemens Corporation, Iselin, NJ (US); Siemens Aktiengesellschaft, Munich (DE)

( * ) Notice: Subject to any disclaimer, the term of this patent is extended or adjusted under 35 U.S.C. 154(b) by 214 days.

(21) Appl. No.: 13/048,930

(22) Filed: Mar. 16, 2011

(65) Prior Publication Data

US 2011/0228992 A1    Sep. 22, 2011

Related U.S. Application Data

(60) Provisional application No. 61/314,281, filed on Mar. 16, 2010.

(51) Int. Cl.
*G06K 9/00* (2006.01)

(52) U.S. Cl.
USPC .......................................... 382/128

(58) Field of Classification Search
USPC .......................................... 382/128, 103, 131
See application file for complete search history.

(56) References Cited

U.S. PATENT DOCUMENTS

| | | | |
|---|---|---|---|
| 6,148,095 A * | 11/2000 | Prause et al. | 382/131 |
| 7,792,342 B2 | 9/2010 | Barbu et al. | |
| 2008/0080754 A1 | 4/2008 | Barbu et al. | |
| 2008/0085050 A1 * | 4/2008 | Barbu et al. | 382/154 |
| 2008/0273777 A1 * | 11/2008 | Luboz et al. | 382/130 |
| 2008/0317370 A1 * | 12/2008 | Florent et al. | 382/260 |
| 2009/0010512 A1 * | 1/2009 | Zhu et al. | 382/130 |
| 2009/0062641 A1 | 3/2009 | Barbu et al. | |
| 2009/0270712 A1 * | 10/2009 | Raghavan et al. | 600/407 |
| 2009/0279767 A1 | 11/2009 | Kukuk et al. | |
| 2010/0121181 A1 | 5/2010 | Wang et al. | |
| 2010/0128953 A1 * | 5/2010 | Ostrovsky-Berman | 382/131 |
| 2010/0161023 A1 * | 6/2010 | Cohen et al. | 623/1.11 |

* cited by examiner

*Primary Examiner* — Bernard Krasnic
*Assistant Examiner* — Weiwen Yang

(57) ABSTRACT

A method and system for detecting a guiding catheter in a 2D fluoroscopic image is disclosed. A plurality of guiding catheter centerline segment candidates are detected in the fluoroscopic image. A guiding catheter centerline connecting an input guiding catheter centerline ending point in the fluoroscopic image with an image margin of the fluoroscopic image is detected based on the plurality of guiding catheter centerline segment candidates.

27 Claims, 6 Drawing Sheets

FIG. 2

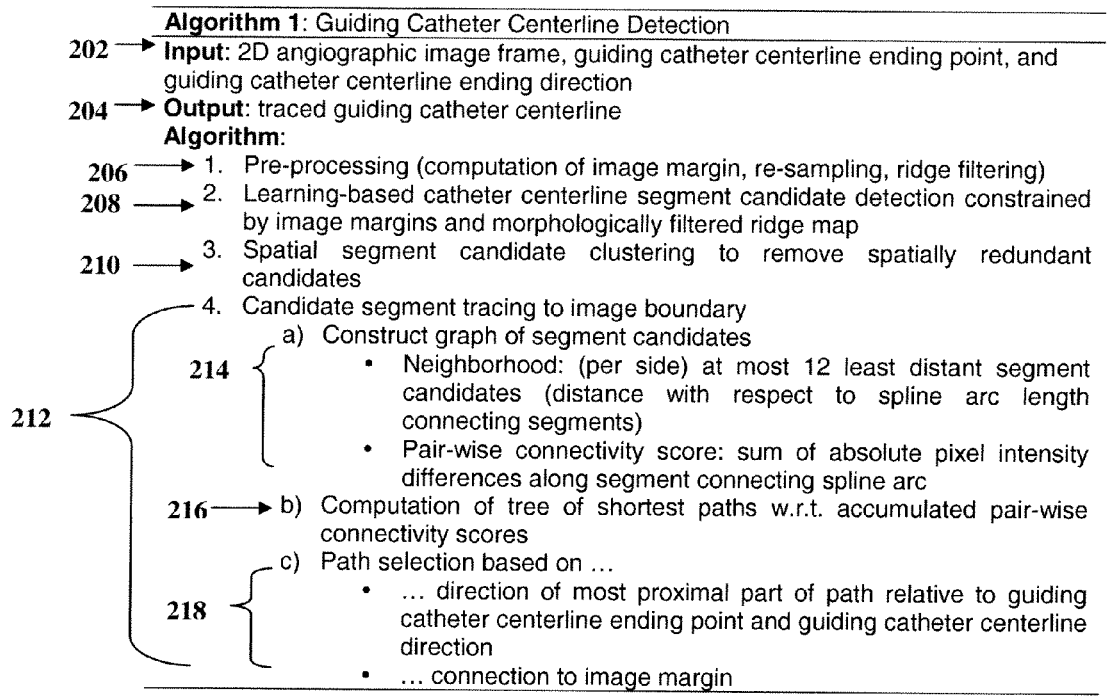

Algorithm 1: Guiding Catheter Centerline Detection

202 → Input: 2D angiographic image frame, guiding catheter centerline ending point, and guiding catheter centerline ending direction
204 → Output: traced guiding catheter centerline
Algorithm:
206 → 1. Pre-processing (computation of image margin, re-sampling, ridge filtering)
208 → 2. Learning-based catheter centerline segment candidate detection constrained by image margins and morphologically filtered ridge map
210 → 3. Spatial segment candidate clustering to remove spatially redundant candidates
212 → 4. Candidate segment tracing to image boundary
  a) Construct graph of segment candidates
    214 • Neighborhood: (per side) at most 12 least distant segment candidates (distance with respect to spline arc length connecting segments)
    • Pair-wise connectivity score: sum of absolute pixel intensity differences along segment connecting spline arc
  216 → b) Computation of tree of shortest paths w.r.t. accumulated pair-wise connectivity scores
  c) Path selection based on ...
    218 • ... direction of most proximal part of path relative to guiding catheter centerline ending point and guiding catheter centerline direction
    • ... connection to image margin

_US 8,548,213 B2_

METHOD AND SYSTEM FOR GUIDING CATHETER DETECTION IN FLUOROSCOPIC IMAGES

This application claims the benefit of U.S. Provisional Application No. 61/314,281, filed Mar. 16, 2010, the disclosure of which is herein incorporated by reference.

BACKGROUND OF THE INVENTION

The present invention relates to guiding catheter detection in fluoroscopic images, and more particularly, to guiding catheter detection in 2D fluoroscopic images for intravascular ultrasound imaging and 2D angiography co-registration.

Intravascular ultrasound (IVUS) is an imaging technique in which an ultrasound transducer is attached to an end of a guidewire. The guidewire is first guided through a guiding catheter and from there through the blood vessels of a patient. The ultrasound transducer is used to obtain ultrasound images from within the vessels. IVUS can be used to obtain images in which an entire cross-section of the interior of the vessel can be seen in a single view. IVUS imaging can be used to determine the amount of plaque present at various points within a blood vessel. In order to determine the location of the IVUS transducer within a patient's body the IVUS images and fluoroscopic images resulting from a 2D angiography can be co-registered.

BRIEF SUMMARY OF THE INVENTION

In order to co-register the images from intravascular ultrasound (IVUS) imaging and a 2D angiography, the IVUS transducer, which is attached to a guidewire tip, should first be detected and tracked in a sequence of 2D fluoroscopic images (2D+t). Tracking can be initialized by first interactively detecting the vessel segment immediately surrounding the guidewire, and second detecting the guiding catheter's centerline based on the centerline of the detected vessel. Embodiments of the present invention provide a method and system for detecting the centerline of the guiding catheter in a fluoroscopic image.

Embodiments of the present invention can be used to detect the guiding catheter in a single contrast-enhanced frame of a fluoroscopic image sequence. The detected guiding catheter, together with the detected vessel, can be used for initialization of tracking an IVUS transducer in a fluoroscopic image sequence and for co-registration of IVUS images and fluoroscopic images from a 2D angiography.

In one embodiment of the present invention, a plurality of guiding catheter centerline segment candidates are detected in the fluoroscopic image. A guiding catheter centerline connecting an input guiding catheter centerline ending point in the fluoroscopic image with an image margin of the fluoroscopic image is detected based on the plurality of guiding catheter centerline segment candidates.

These and other advantages of the invention will be apparent to those of ordinary skill in the art by reference to the following detailed description and the accompanying drawings.

BRIEF DESCRIPTION OF THE DRAWINGS

FIG. 2 illustrates pseudo code showing an algorithm for implementing the method of FIG. 1 according to an embodiment of the present invention;

DETAILED DESCRIPTION

The present invention relates to a method and system for detecting a guiding catheter in a fluoroscopic image. Embodiments of the present invention are described herein to give a visual understanding of the guiding catheter detection method. A digital image is often composed of digital representations of one or more objects (or shapes). The digital representation of an object is often described herein in terms of identifying and manipulating the object. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide a method for guiding catheter detection in contrast-enhanced 2D fluoroscopic imaging data. Given a 2D angiographic fluoroscopic image, embodiments of the present invention automatically detects the shape of the guiding catheter, and can be integrated into the workflow of intravascular ultrasound (IVUS)/angiography co-registration without extra actions by a user. The detected shape of the guiding catheter can be treated as a prior for tracking the guiding catheter in dynamic fluoroscopic screening during pullback of the IVUS transducer, which is an essential component for IVUS/angiography co-registration.

Before co-registration can take place, the IVUS transducer, which is attached to the guidewire tip, has to be detected and tracked in a 2D+t sequence of fluoroscopic images. In particular, the IVUS transducer should be tracked in a non-contrast enhanced 2D+t fluoroscopic (x-ray) image sequence. Tracking can be initialized by (1) interactively detecting the vessel segment immediately surrounding the guidewire, and (2) detecting the guiding catheter's centerline based on the centerline of the detected vessel. Both of these steps can be implemented using a single frame of a contrast enhanced angiographic fluoroscopic image sequence. Embodiments of the present invention provide a method and apparatus that detect the centerline of a guiding catheter based on the centerline of a detected vessel segment (step (2) above). The vessel segment's starting point is obtained by an interactive detection procedure of step (1) above. The staring point of the guiding catheter may be only roughly determined, as this tubular structure may enter an image frame at any of four image margins (left, right, top, and bottom). In embodiments of the present invention, a guiding catheter's centerline is detected from the starting point of the vessel segment to the image margin, given the image and vessel segment detection result.

Figure 1:
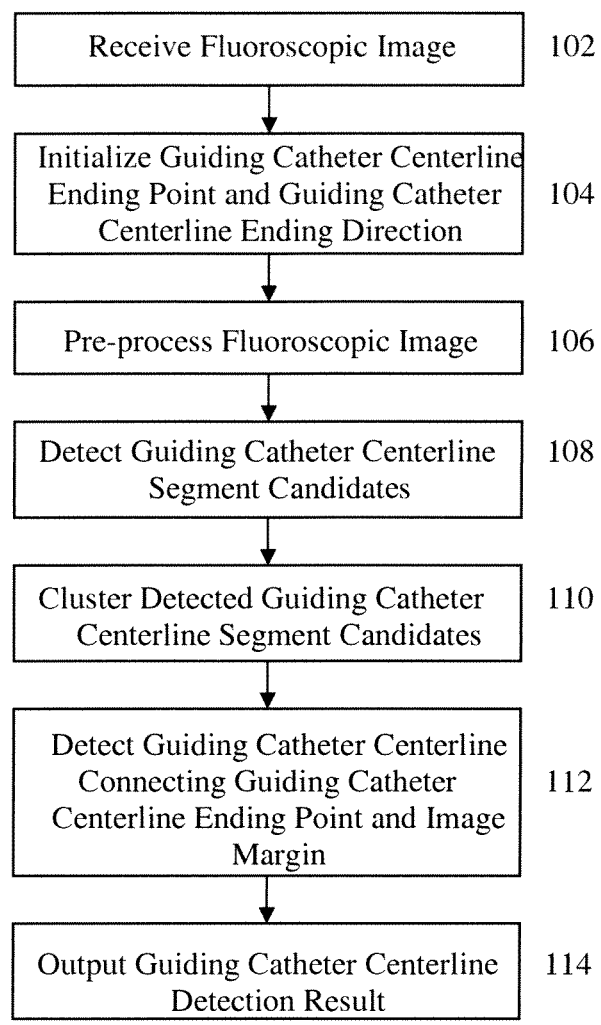
FIG. 1 illustrates a method of detect a guiding catheter in a fluoroscopic image according to an embodiment of the present invention.

FIG. 1 illustrates a method of detect a guiding catheter in a fluoroscopic image according to an embodiment of the present invention. The method of FIG. 1 transforms image data representing the anatomy of a patient in order to detect a centerline of a guiding catheter in the image data. FIG. 2 illustrates pseudo code showing an algorithm for implementing the method of FIG. 1 according to an embodiment of the present invention.

Figure 3:
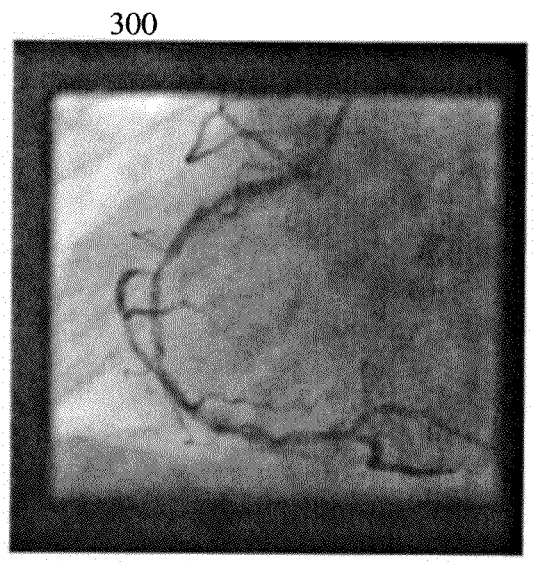
FIG. 3 illustrates an exemplary angiographic 2D fluoroscopic image.

Referring to FIG. 1, at step 102, a fluoroscopic image is received. The fluoroscopic image can be a contrast enhanced x-ray image. The fluoroscopic image may be a frame of a fluoroscopic image sequence. The fluoroscopic image can be received directly from an x-ray imaging device. It is also possible that the fluoroscopic image can be received by loading a previously stored fluoroscopic image. FIG. 3 illustrates an exemplary angiographic 2D fluoroscopic image 300. The fluoroscopic image 300 is contrast enhanced, making the vessel regions appear darker than the background of the image 300.

Returning to FIG. 1, at step 104, a guiding catheter centerline ending point and a guiding catheter centerline ending direction are initialized in the fluoroscopic image. In a possible implementation, the guiding catheter centerline ending point and ending direction can be determined based on a location of a guidewire detected in the image. For example, the guidewire can be detected in the fluoroscopic image using the method described in U.S. Pat. No. 7,792,342, which is incorporated herein by reference. The catheter centerline ending point can be initialized as the ending point of the vessel segment immediately surrounding the guidewire, and catheter centerline ending direction can be initialized as the general direction of the vessel segment relative to the ending point. It is also possible that the guiding catheter centerline ending point and the guiding catheter centerline ending direction may be initialized by a user interaction. Referring to FIG. 2, as shown at 202, a 2D angiographic image frame, the guiding catheter centerline ending point, and the guiding catheter centerline ending direction are inputs to the algorithm of FIG. 2. As shown at 204, the algorithm of FIG. 2 outputs a traced guiding catheter centerline.

Figure 4:
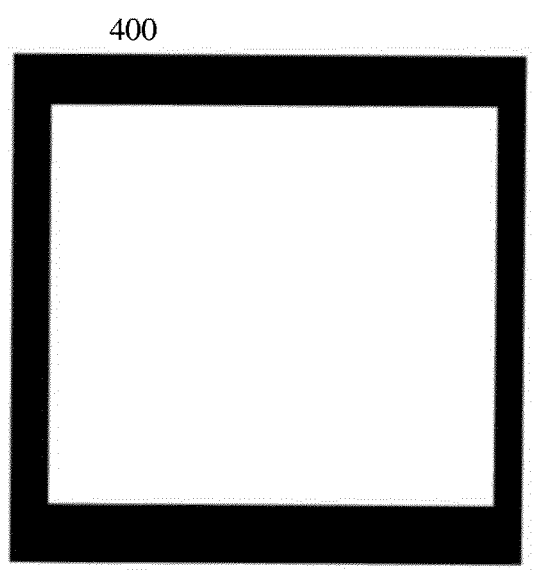
FIG. 4 illustrates an exemplary image margin mask.
Figure 5:
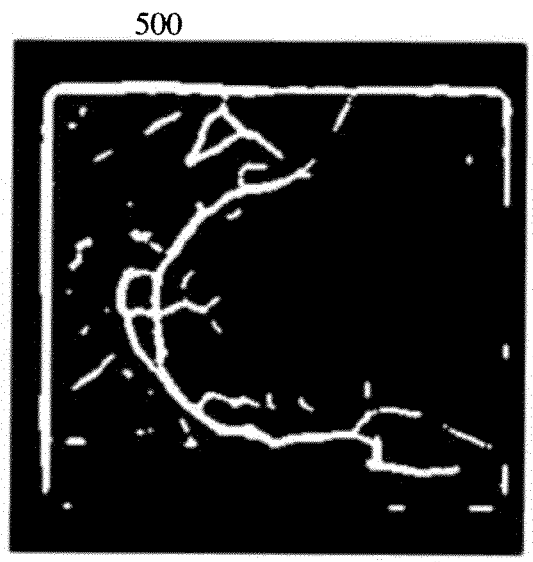
FIG. 5 illustrates an exemplary ridge map generated by ridge filtering.

Returning to FIG. 1, at step 106, the fluoroscopic image is pre-processed. The pre-processing step is shown 206 of FIG. 2. During pre-processing the image margin of the fluoroscopic image is detected. According to an advantageous implementation, the image margin of the fluoroscopic image can be detected using mean thresholding. FIG. 4 illustrates an exemplary image margin mask 400 detected during pre-processing of the fluoroscopic image 300 of FIG. 3. As shown in FIG. 4, the image margin mask 400 shows the locations of the left, right, top, and bottom image margins of the fluoroscopic image. The image can then be re-sampled. For example, the image can be down-sampled to be suited for faster processing. The re-sampled image can then be filtered using ridge filtering and subjected to further thresholding. This results in a morphologically filtered mask, or a ridge map, that is used to narrow the search space considered in subsequent guiding catheter centerline detection steps. This reduces the number of false positive detection results when searching for appropriate guiding catheter segment candidates. FIG. 5 illustrates an exemplary ridge map 500 generated during pre-processing of the fluoroscopic image 300 of FIG. 3 using ridge filtering.

Figure 6:
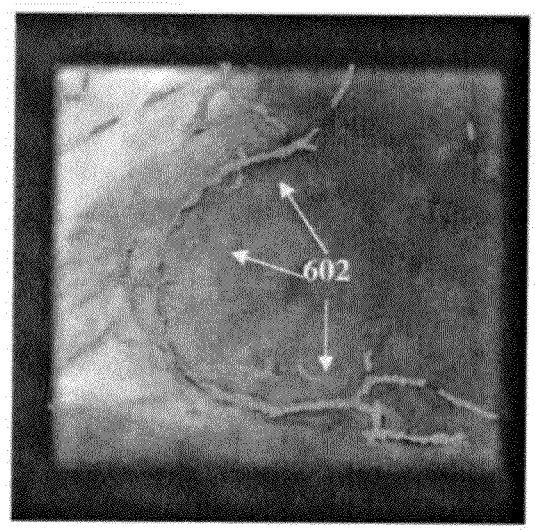
FIG. 6 illustrates exemplary guiding catheter centerline segment candidates.

Returning to FIG. 1, at step 108, guiding catheter centerline segment candidates are detected in the fluoroscopic image sequence. This step is shown at 206 of FIG. 2. In particular, learning-based catheter centerline segment candidate detection is constrained by the detected image margins and the morphologically filtered ridge map. A machine learning-based technique is applied to the fluoroscopic image to identify possible guiding catheter centerline segment candidates. The guiding catheter centerline segment candidates are each represented by a translation (offset), orientation, and scale (length). A guiding catheter centerline segment detector is a discriminative model, such as a probabilistic boosting tree (PBT), that can be trained based on annotated training data using 2D Haar-like features. The trained guiding catheter centerline segment detector is applied to the fluoroscopic image to detect guiding catheter segment candidates in the fluoroscopic image. The search area for detecting the guiding catheter centerline segment candidates can be constrained based on the ridge map and the image margins detected in step 104. The PBT returns a confidence value for every candidate detected. Accordingly, based on the confidence values of the detected guiding catheter centerline segment candidates, a predetermined maximum number of top segment candidates can be retained to be considered in further processing steps. FIG. 6 illustrates exemplary guiding catheter centerline segment candidates 602 detected in the fluoroscopic image 300 of FIG. 3. As shown in FIG. 6, the detected guiding catheter centerline segment candidates 602 are overlaid on the original frame.

Figure 7:
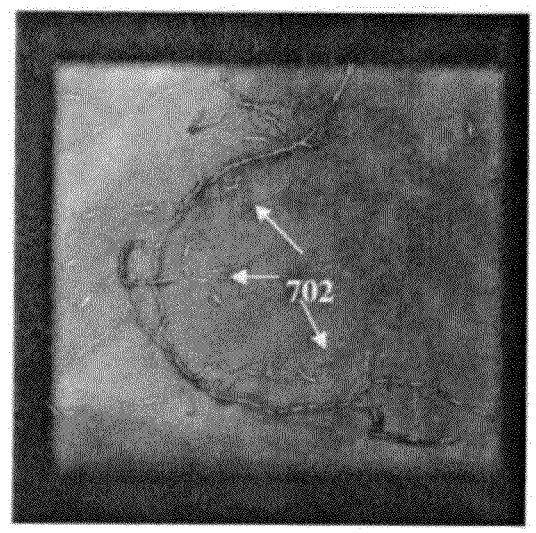
FIG. 7 illustrates exemplary clusters of guiding catheter centerline segment candidates.

Returning to FIG. 1, at step 110, the detected guiding catheter centerline segment candidates are clustered. This step is shown at 210 of FIG. 2. In particular, spatial segment candidate clustering is performed to remove spatially redundant candidates. The predetermined maximum number of guiding catheter centerline segment candidates detected in step 106 can be spatially clustered into a predetermined number of clusters. For example, the clustering can be performed using K-Means clustering. As a result of the clustering, candidates that are close to each other, and therefore can be considered redundant, are grouped together and reduced to a single representative. FIG. 7 illustrates exemplary clusters 702 of guiding catheter centerline segment candidates. As shown in FIG. 7, the guiding catheter centerline segment candidates 602 of FIG. 6 are clustered into the clusters 702, which are overlaid on the original frame.

Returning to FIG. 1, at step 112, a guiding catheter centerline connecting the guiding catheter centerline ending point with the image margin is detected based on the clustered guiding catheter centerline segment candidates. This step is shown at 212 of FIG. 2. Step 212 of FIG. 2 includes sub steps 214, 216, and 218. The most likely correct segment candidates connecting the guiding catheter centerline ending point with one of the image margins (left, right, top, or bottom) are grouped together into one single path, resulting in a detected guiding catheter centerline.

As shown at step 214 of FIG. 2, in order to detect the most likely guiding catheter centerline path, a weighted graph is constructed from the clustered guiding catheter segment candidates. The clustered candidates are the vertices (nodes) of the graph. The edges of the graph are determined by spatial proximity between candidate segments. In an advantageous embodiment, for each candidate, only 12 candidates per side that are spatially closest are considered to be adjacent vertices that are connected by edges. Spatial proximity can be represented by the physical distance along the spline arcs connecting the two segment candidates of interest. The edge weights, or pair-wise connectivity scores, between two adjacent vertices are "distances" defined by the sum of absolute pixel intensity differences in the original frame along the connecting spline arc between the two adjacent vertices. This pair-wise connectivity is high for small "distances" and low for large ones.

As shown at step 216 of FIG. 2, a tree of shortest path candidates with respect to accumulate pair-wise connectivity scores is generated based on the graph. The shortest path candidates are generated by starting at the root node representing the guiding catheter centerline ending point and finding a shortest path from the root node through each of the segment candidates adjacent to the root node. Accordingly, by algorithmically constructing the tree of shortest paths spanning the original graph relative to the guiding catheter ending point, path candidates can be generated for the guiding catheter centerline.

As shown at step 218 of FIG. 2, one of the shortest path candidates is selected as the guiding catheter centerline. The path selection is based on the direction of the most proximal part of each path candidate relative to the guiding catheter centerline ending point and the guiding catheter centerline ending direction and the connection of each path candidate to an image margin. In particular, among the shortest path candidates connecting the guiding catheter centerline ending point with the image margin, the shortest one fulfilling the orientation constraint introduced by the guiding catheter centerline ending direction is selected to be the final guiding catheter centerline detection result.

Figure 8:
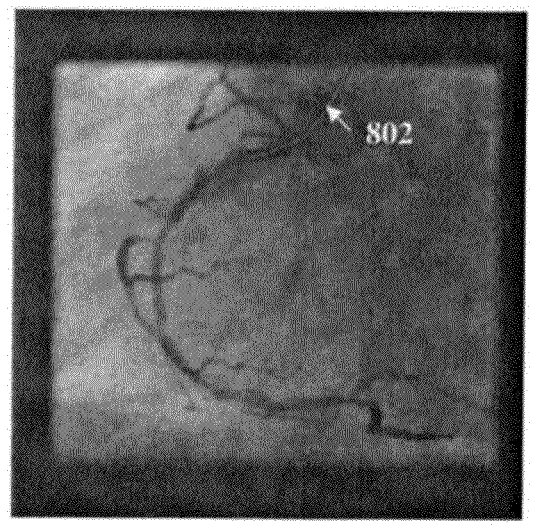
FIG. 8 illustrates an exemplary guiding catheter detection result.

Returning to FIG. 1, at step 114, the guiding catheter centerline detection result is output. For example, the detected guiding catheter centerline can be output by displaying the detected guiding catheter centerline on a display device of a computer system used to implement the guiding catheter detection. FIG. 8 illustrates the final guiding catheter detection result 802 for the fluoroscopic image 300 of FIG. 3. As shown in FIG. 8, the detected guiding catheter centerline 802 is overlaid on the original frame. The guiding catheter centerline detection result can also be output by storing the detection result, for example, on a memory or storage of a computer system or on a computer readable medium. The guiding catheter centerline detection result can be used as an input for an IVUS transducer tracking procedure and/or an IVUS/angiography co-registration procedure.

As described above, the method of FIG. 1 can be used for guiding catheter detection in a 2D angiographic fluoroscopic image. According to an embodiment of the present invention, this method traces the guiding catheter centerline, beginning from its interactively determined ending point to the image margin. The guiding catheter centerline ending direction can also be acquired in an interactive manner and constrains the guiding catheter centerline detection. This method is advantageous since, due to the requirements of a typical IVUS/angiography co-registration system, the missing starting point of the IVUS transducer cannot be directly input by the user. Furthermore, previous techniques for detecting wire-like structures of interest typically require two or more input points to constrain the detection. The method of FIG. 1 is constrained by only one point and the rough direction at the ending of the guiding catheter centerline. The second point to which a path is detected can be any point along the automatically detected image margins.

Figure 9:
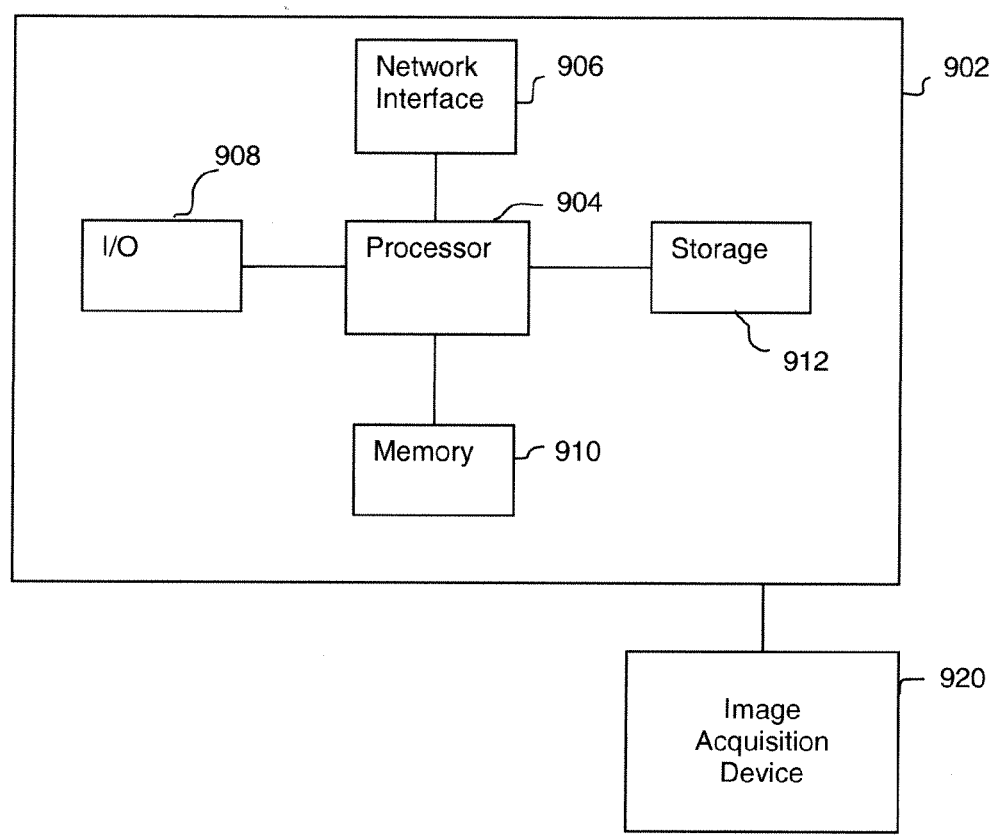
FIG. 9 is a high level block diagram of a computer capable of implementing the present invention.

The above-described methods for guiding catheter detection in a fluoroscopic image may be implemented on a computer using well-known computer processors, memory units, storage devices, computer software, and other components. A high level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium, (e.g., magnetic disk) and loaded into memory 910 when execution of the computer program instructions is desired. Thus, all method steps described above, including the method steps illustrated in FIGS. 1 and 2, may be defined by the computer program instructions stored in the memory 910 and/or storage 912 and controlled by the processor 904 executing the computer program instructions. An image acquisition device 920, such as an X-ray imaging device, can be connected to the computer 902 to input fluoroscopic image sequences to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.) One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a guiding catheter in a fluoroscopic image, comprising:
    detecting a plurality of guiding catheter centerline segment candidates in the fluoroscopic image;
    clustering the plurality of guiding catheter centerline segment candidates into a number of guiding catheter centerline segment clusters; and
    detecting a guiding catheter centerline connecting a guiding catheter centerline ending point in the fluoroscopic image with an image margin of the fluoroscopic image by connecting a plurality of the guiding catheter centerline segment clusters.

2. The method of claim 1, further comprising:
    automatically detecting the image margin of the fluoroscopic image; and
    generating a ridge map of the fluoroscopic image by ridge filtering the fluoroscopic image, where the step of detecting a plurality of guiding catheter centerline segments is constrained based on the detected image margin and the ridge map.

3. The method of claim 2, wherein the step of automatically detecting the image margin of the fluoroscopic image comprises:
    detecting the image margin of the fluoroscopic image using mean thresholding.

4. The method of claim 2, wherein the step of generating a ridge map of the fluoroscopic image by ridge filtering the fluoroscopic image comprises:
    down-sampling the fluoroscopic image; and
    filtering the down-sampled fluoroscopic image using ridge filtering.

5. The method of claim 1, wherein the step of detecting a plurality of guiding catheter centerline segment candidates in the fluoroscopic image comprises:

detecting the plurality of guiding catheter centerline segment candidates in the fluoroscopic image using a guiding catheter centerline segment detector trained based on annotated training data.

6. The method of claim 5, wherein the guiding catheter centerline segment detector is a probabilistic boosting tree (PBT) trained using 2D Haar-like features.

7. The method of claim 1, wherein the step of detecting a guiding catheter centerline connecting a guiding catheter centerline ending point in the fluoroscopic image with an image margin of the fluoroscopic image based on the plurality of guiding catheter centerline segment candidates comprises:

detecting the guiding catheter centerline connecting the guiding catheter centerline ending point with the image margin in a guiding catheter centerline ending direction.

8. The method of claim 1, wherein the step of detecting a guiding catheter centerline connecting a guiding catheter centerline ending point in the fluoroscopic image with an image margin of the fluoroscopic image based on the plurality of guiding catheter centerline segment candidates comprises:

generating a graph of the guiding catheter centerline segment candidates;
   generating a tree of shortest path candidates based on the graph; and
   selecting one of the shortest path candidates as the guiding catheter centerline.

9. The method of claim 8, wherein the step of generating a graph of the guiding catheter centerline segment candidates comprises:

representing each of the plurality of guiding catheter centerline segment candidates as a node in the graph;
   generating edges connecting the node representing each guiding catheter centerline segment candidate with one or more nodes representing at most a predetermined number of spatially closest guiding catheter centerline segment candidates; and
   calculating a pair-wise connectivity score for each edge as a sum of absolute pixel intensity differences in the fluoroscopic image along a spline arc connecting the guiding catheter centerline segment candidates represented by the nodes connected by the edge.

10. The method of claim 8, wherein the step of generating a tree of shortest path candidates based on the graph comprises:

generating a shortest path from a node in the graph representing the guiding catheter centerline ending point through each of a plurality of nodes in the graph representing guiding catheter centerline segment candidates spatially closest to the guiding catheter centerline ending point.

11. The method of claim 8, wherein the step of selecting one of the shortest path candidates as the guiding catheter centerline comprises:

selecting a shortest one of the shortest path candidates that connects the guiding catheter centerline ending point with the image margin and that has an orientation corresponding to a guiding catheter ending direction.

12. An apparatus for detecting a guiding catheter in a fluoroscopic image, comprising:

means for detecting a plurality of guiding catheter centerline segment candidates in the fluoroscopic image;
    means for clustering the plurality of guiding catheter centerline segment candidates into a number of guiding catheter centerline segment clusters; and
    means for detecting a guiding catheter centerline connecting a guiding catheter centerline ending point in the fluoroscopic image with an image margin of the fluoroscopic image by connecting a plurality of the guiding catheter centerline segment clusters.

13. The apparatus of claim 12, further comprising:

means for automatically detecting the image margin of the fluoroscopic image; and
    means for generating a ridge map of the fluoroscopic image by ridge filtering the fluoroscopic image, where the detecting a plurality of guiding catheter centerline segments is constrained based on the detected image margin and the ridge map.

14. The apparatus of claim 12, wherein the means for detecting a plurality of guiding catheter centerline segment candidates in the fluoroscopic image comprises:

means for detecting the plurality of guiding catheter centerline segment candidates in the fluoroscopic image using a guiding catheter centerline segment detector trained based on annotated training data.

15. The apparatus of claim 12, wherein the means for detecting a guiding catheter centerline connecting a guiding catheter centerline ending point in the fluoroscopic image with an image margin of the fluoroscopic image based on the plurality of guiding catheter centerline segment candidates comprises:

means for detecting the guiding catheter centerline connecting the guiding catheter centerline ending point with the image margin in a guiding catheter centerline ending direction.

16. The apparatus of claim 15, wherein the means for detecting a guiding catheter centerline connecting a guiding catheter centerline ending point in the fluoroscopic image with an image margin of the fluoroscopic image based on the plurality of guiding catheter centerline segment candidates comprises:

means for generating a graph of the guiding catheter centerline segment candidates;
    means for generating a tree of shortest path candidates based on the graph; and
    means for selecting one of the shortest path candidates as the guiding catheter centerline.

17. The apparatus of claim 16, wherein the means for generating a graph of the guiding catheter centerline segment candidates comprises:

means for representing each of the plurality of guiding catheter centerline segment candidates as a node in the graph;
    means for generating edges connecting the node representing each guiding catheter centerline segment candidate with one or more nodes representing at most a predetermined number of spatially closest guiding catheter centerline segment candidates; and
    means for calculating a pair-wise connectivity score for each edge as a sum of absolute pixel intensity differences in the fluoroscopic image along a spline arc connecting the guiding catheter centerline segment candidates represented by the nodes connected by the edge.

18. The apparatus of claim 16, wherein the means for generating a tree of shortest path candidates based on the graph comprises:

means for generating a shortest path from a node in the graph representing the guiding catheter centerline ending point through each of a plurality of nodes in the graph representing guiding catheter centerline segment candidates spatially closest to the guiding catheter centerline ending point.

19. The apparatus of claim 16, wherein the means for selecting one of the shortest path candidates as the guiding catheter centerline comprises:

means for selecting a shortest one of the shortest path candidates that connects the guiding catheter centerline ending point with the image margin and that has an orientation corresponding to a guiding catheter ending direction.

20. A non-transitory computer readable medium encoded with computer executable instructions for detecting a guiding catheter in a fluoroscopic image, the computer executable instructions defining steps comprising:

detecting a plurality of guiding catheter centerline segment candidates in the fluoroscopic image;

clustering the plurality of guiding catheter centerline segment candidates into a number of guiding catheter centerline segment clusters; and detecting a guiding catheter centerline connecting a guiding catheter centerline ending point in the fluoroscopic image with an image margin of the fluoroscopic image by connecting a plurality of the guiding catheter centerline segment clusters.

21. The computer readable medium of claim 20, further comprising computer executable instructions defining the steps of:

automatically detecting the image margin of the fluoroscopic image; and generating a ridge map of the fluoroscopic image by ridge filtering the fluoroscopic image, where the step of detecting a plurality of guiding catheter centerline segments is constrained based on the detected image margin and the ridge map.

22. The computer readable medium of claim 20, wherein the computer executable instructions defining the step of detecting a plurality of guiding catheter centerline segment candidates in the fluoroscopic image comprise computer executable instructions defining the step of:

detecting the plurality of guiding catheter centerline segment candidates in the fluoroscopic image using a guiding catheter centerline segment detector trained based on annotated training data.

23. The computer readable medium of claim 20, wherein the computer executable instructions defining the step of detecting a guiding catheter centerline connecting a guiding catheter centerline ending point in the fluoroscopic image with an image margin of the fluoroscopic image based on the plurality of guiding catheter centerline segment candidates comprise computer executable instructions defining the step of:

detecting the guiding catheter centerline connecting the guiding catheter centerline ending point with the image margin in a guiding catheter centerline ending direction.

24. The computer readable medium of claim 20, wherein the computer executable instructions defining the step of detecting a guiding catheter centerline connecting a guiding catheter centerline ending point in the fluoroscopic image with an image margin of the fluoroscopic image based on the plurality of guiding catheter centerline segment candidates comprise computer executable instructions defining the steps of:

generating a graph of the guiding catheter centerline segment candidates;

generating a tree of shortest path candidates based on the graph; and selecting one of the shortest path candidates as the guiding catheter centerline.

25. The computer readable medium of claim 24, wherein the computer executable instructions defining the step of generating a graph of the guiding catheter centerline segment candidates comprise computer executable instructions defining the steps of:

representing each of the plurality of guiding catheter centerline segment candidates as a node in the graph;

generating edges connecting the node representing each guiding catheter centerline segment candidate with one or more nodes representing at most a predetermined number of spatially closest guiding catheter centerline segment candidates; and calculating a pair-wise connectivity score for each edge as a sum of absolute pixel intensity differences in the fluoroscopic image along a spline arc connecting the guiding catheter centerline segment candidates represented by the nodes connected by the edge.

26. The computer readable medium of claim 24, wherein the computer executable instructions defining the step of generating a tree of shortest path candidates based on the graph comprise computer executable instructions defining the step of:

generating a shortest path from a node in the graph representing the guiding catheter centerline ending point through each of a plurality of nodes in the graph representing guiding catheter centerline segment candidates spatially closest to the guiding catheter centerline ending point.

27. The computer readable medium of claim 24, wherein the computer executable instructions defining the step of selecting one of the shortest path candidates as the guiding catheter centerline comprise computer executable instructions defining the step of:

selecting a shortest one of the shortest path candidates that connects the guiding catheter centerline ending point with the image margin and that has an orientation corresponding to a guiding catheter ending direction.

* * * * *